US 9,298,757 B1

(12) United States Patent
Ponvert et al.

(10) Patent No.: US 9,298,757 B1
(45) Date of Patent: Mar. 29, 2016

(54) DETERMINING SIMILARITY OF LINGUISTIC OBJECTS

(71) Applicant: StoredIQ, Inc., Austin, TX (US)

(72) Inventors: Elias Ponvert, Austin, TX (US); Michael Tuyen Tran, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 191 days.

(21) Appl. No.: 13/801,278

(22) Filed: Mar. 13, 2013

(51) Int. Cl.
*G06F 17/30* (2006.01)

(52) U.S. Cl.
CPC ................................ *G06F 17/30312* (2013.01)

(58) Field of Classification Search
CPC . G06F 17/3069; G06F 11/1076; G06F 17/10; G06Q 10/06
See application file for complete search history.

(56) References Cited

U.S. PATENT DOCUMENTS

| | | | |
|---|---|---|---|
| 7,158,961 B1 | 1/2007 | Charikar | |
| 7,610,329 B2 | 10/2009 | Bone et al. | |
| 8,032,501 B2 | 10/2011 | Bone et al. | |
| 8,086,553 B2 | 12/2011 | Bone et al. | |
| 8,515,964 B2* | 8/2013 | Ravikumar | G06F 17/30628 707/661 |
| 8,612,404 B2 | 12/2013 | Bone et al. | |
| 8,898,101 B2 | 11/2014 | Bone et al. | |
| 2004/0260727 A1* | 12/2004 | Goldstein et al. | 707/104.1 |
| 2010/0077015 A1* | 3/2010 | Eshghi | G06F 17/10 708/400 |
| 2011/0196874 A1* | 8/2011 | Ittiachen | G06F 17/30699 707/747 |
| 2013/0204905 A1* | 8/2013 | Ioffe | H04L 9/3236 707/803 |

OTHER PUBLICATIONS

Gorman, James and Curran, James R., Scaling Distributional Similarity to Large Corpora . . . , Proceedings of the 21st Int'l Conf. on Computational Linguistics and 44th Ann. Meeting of the ACL, Sydney, Jul. 2006, pp. 361-368.
Ravichandran, Deepak, Pantel, Patrick, and Hovy, Eduard, Randomized Algorithms and NLP: Using Locality Sensitive Hash Function for High Speed Noun Clustering, Proceedings of the 43rd Ann. Meeting of the ACL, Ann Arbor, Jun. 2005, pp. 622-629.
Van Durme, Benjamin and Lall, Ashwin, Online Generation of Locality Sensitive Hash Signatures, Proceedings of the ACL 2010 Conf. Short Papers, Uppsala, Sweden, Jul. 11-16, 2010, pp. 231-235.

(Continued)

*Primary Examiner* — Mariela Reyes
*Assistant Examiner* — Courtney Harmon
(74) *Attorney, Agent, or Firm* — Yeen Tham; Edell, Shapiro & Finnan, LLC (57) ABSTRACT

A computer-implemented system for searching includes a data store accessible via a network for storing a data set; an indexing system coupled to the network and indexing the data set, the indexing system configured to generate content vectors for terms in the data set; generate index vectors for terms in the data set; and generate a bitset signature from the index vector. The system further includes a search module coupled to the network and configured to receive a search query and perform a search on one or more terms in the search query by accessing a bitset signature and content vector corresponding to the term; retrieving bitset signatures that are within a predetermined closeness to the bitset signature; selecting content vectors corresponding to retrieved bitset signatures; and selecting content vectors that are within a predetermined similarity to the term content vector; and return the terms corresponding to the content vectors.

18 Claims, 9 Drawing Sheets

(56) References Cited

OTHER PUBLICATIONS

Petrovic, Sasa, Osborne, Miles, and Lavrenko, Victor, Streaming First Story Detection with application to Twitter, Human Language Tech.: The 2010 Ann. Conf. of the North Am. Ch. Of the ACL, Los Angeles, CA, Jun. 2010, pp. 181-189.

Sahlgren, Magnus, An Introduction to Random Indexing, Methods and Applications of Semantic Indexing Workshop at the 7th Int'l Conf. on Terminology and Knowledge Eng., TKE, vol. 5, 2005, 9 pgs.

Cohen, Trevor, Schvaneveldt, Roger, Widdows, Dominic, Reflective Random Indexing and indirect inference: A scalable method for discovery of implicit connections, Journal of Biomedical Informatics 43 (2010), pp. 240-256.

The Semantic Vectors Package, Semanticvectors, printed on Mar. 18, 2013, 1 pg. at <htttp://code.google.com/p/semanticvectors/>.

Sahlgren, Magnus, Random Indexing Bibliography, printed on Mar. 13, 2013, 2 pages, at <http://vvww.sics.se/~mange/random_indexing.html>.

Sahlgren, M. and Karlgren, J., Automatic bilingual lexicon acquisition using Random Indexing of parallel corpora . . . , Journal of Natural Language Eng., Special Issue on Parallel Texts, Jun. 2005, pp. 1-15.

Charikar, Moses S., Similarity Estimation Techniques from Rounding Algorithms, Proceedings from the 34th Annual ACM Symposium on Theory of Computing, May 19-21, 2002, Montreal, QC, CA, 9 pgs.

Indyk, Piotr and Motwani, Rajeev, Approximate Nearest Neighbors: Towards Removing the Curse of Dimensionality, Apr. 4, 1998, Proceedings of the 30th ACM Symposium on Theory of Computing, 20 pgs.

Velldal, Erik, Random Indexing Re-Hashed, University of Oslo, Norway, Nodalida 2011 Conf. Proceedings, ISSN 1736-6305, vol. 11, pp. 224-229.

\* cited by examiner

DETERMINING SIMILARITY OF LINGUISTIC OBJECTS

TECHNICAL FIELD

This disclosure relates generally to determining similarity of linguistic objects. More specifically, this disclosure relates to embodiments of systems, methods, and apparatuses for efficiently implementing similarity searching.

BACKGROUND

Modern search engines attempt to return results based not just on the forms of words in a query, but on their meaning, or semantic content. That is, search engines attempt to return results based on semantic similarity. For example, search engines may attempt to search documents not just based on query terms themselves but may additionally attempt to use terms that are related (semantically similar) to augment the search.

To calculate the similarity between natural language terms, a common technique is to employ a vector comparison. In particular, such techniques convert the terms into vectors based on their distribution among documents or nearby terms. The similarity of the corresponding terms is then determined by calculating the similarity of the vectors using a metric such as cosine similarity. That is, each vector must be compared to each other vector. However, to find the terms most similar to a given query term, it is onerous and time-consuming to check every other term in the data set, calculating the similarity for each.

Consequently, techniques have been developed to reduce the complexity of the similarity calculations. One technique for scaling the term semantic similarity calculation is to index terms with "signatures" using locality sensitive hashing (LSH). (Hashing is a technique that maps large sets of data of variable length to smaller sets of fixed length). A comparison between index signatures is typically much faster that a comparison between vectors, and approximates the similarity between the terms themselves.

In general, these index signatures are used to index and group term vectors. To look up related terms, they are used to extract a subset of candidate vectors which can themselves be compared.

Different LSH techniques may be used to approximate different similarity measures. For cosine similarity, an LSH technique called "simhash" is often used. Simhash compares a vector to n random vectors and computes an n length bitset signature from the results. However, these comparisons can take a long time and this requires maintaining resources—a set of random vectors—which complicates deployment in a distributed computing environment. In some systems, a technique known as random indexing (RI) may be used for dimensionality reduction, specifically for the construction of vectors representing terms (or documents) in a large data-set with a fixed-dimensionality vector space representation.

LSH and simhash techniques are described in Moses S. Charikar, "Similarity estimation techniques from rounding algorithms," *Proceedings of the thirty-fourth annual ACM symposium on Theory of computing*. ACM, 2002; Moses S. Charikar, "Methods and apparatus for estimating similarity," U.S. Pat. No. 7,158,961; Piotr Indyk and Rajeev Motwani, "Approximate nearest neighbors: towards removing the curse of dimensionality." *Proceedings of the thirtieth annual ACM symposium on Theory of computing*, ACM, 1998; and Deepak Ravichandran, Patrick Pantel, and Eduard Hovy, "Randomized algorithms and NLP: Using locality sensitive hash functions for high speed noun clustering," Proceedings of the 43rd Annual Meeting of the ACL, pages 622-629, Ann Arbor, June 2005, © 2005 Association for Computational Linguistics, all of which are hereby incorporated by reference in their entireties as if fully set forth herein.

Some methods additionally make use of a technique known as "random indexing," a method for constructing low dimensionality vectors for semantic similarity calculation. Details on random indexing techniques are described in Magnus Sahlgren, "An introduction to random indexing," *Methods and Applications of Semantic Indexing Workshop at the 7th International Conference on Terminology and Knowledge Engineering*, TKE, Vol. 5, 2005; and Erik Veldal, "Random Indexing Re-Hashed," Bolette Sandford Pedersen, Gunta Nespore and Inguna Skadin, (Eds.), NODALIDA 2011 Conference Proceedings, pp. 224-229, 2011, both of which are hereby incorporated by reference in their entireties as if fully set forth herein.

SUMMARY

Broadly speaking, embodiments of linguistic similarity techniques described herein may be used for determination of similarity between any data construct, including term-to-term similarity and document-to-document similarity.

A computer-implemented system for searching in accordance with embodiments includes a data store accessible via a network for storing a data set; an indexing system coupled to the network and indexing the data set, the indexing system configured to generate content vectors for terms in the data set; generate index vectors for terms in the data set; and generate a bitset signature from the index vector. The system further includes a search module coupled to the network and configured to receive a search query and perform a search on one or more terms in the search query by accessing a bitset signature and content vector corresponding to the term; retrieving bitset signatures that are within a predetermined closeness to the bitset signature; selecting content vectors corresponding to retrieved bitset signatures; and selecting content vectors that are within a predetermined similarity to the term content vector; returning the terms corresponding to the content vectors. The terms may then be used to search a data set of documents.

In some embodiments, the index vectors and the content vectors are generated using random indexing. In some embodiments, the index vectors and the content vectors are generated using hashing. In some embodiments, the index vectors are smaller in dimension than the content vectors. In some embodiments, the bitset signatures are twice a length of the index vectors.

In some embodiments, the indexing system is configured to generate the bitset signatures from the index vectors by creating a bitset signature having twice the length of the index vector, and for each of a predetermined number of highest magnitude positive dimensions in the index vectors, setting a corresponding bitset signature value to a predetermined value; and for each of the predetermined number of highest magnitude negative dimensions in the index vectors, setting a corresponding bitset signature value to the predetermined value.

A computer program product according to some embodiments includes one or more computer readable storage media storing instructions translatable by one or more processors to perform: indexing terms in a data set by: generating content vectors for terms in the data set; generating index vectors for terms in the data set; generating bitset signatures from the index vectors; and storing the bitset signatures and content vectors in an index. The instructions are further translatable for performing a search on one or more terms in a search query by accessing a bitset signature and content vector corresponding to the term from the index; retrieving bitset signatures from the index that are within a predetermined closeness to the bitset signature; selecting content vectors from the index corresponding to retrieved bitset signatures; and selecting content vectors that are within a predetermined similarity to the content vector; and returning the terms corresponding to the content vectors. The terms may then be used to search a data set of documents.

A computer-implemented method according to some embodiments includes indexing terms in a data set stored in a data store by: generating content vectors for terms in the data set; generating index vectors for terms in the data set; generating bitset signatures from the index vectors; and storing the bitset signatures and content vectors in an index; performing a search on one or more terms in a search query received via a computer by accessing a bitset signature and content vector corresponding to the term from the index; retrieving bitset signatures from the index that are within a predetermined closeness to the bitset signature; selecting content vectors from the index corresponding to retrieved bitset signatures; and selecting content vectors that are within a predetermined similarity to the content vector; and returning terms corresponding to the content vectors from a data store. The terms may then be used to search a data set of documents.

Additional objects and advantages of the present disclosure will become apparent to one skilled in the art upon reading and understanding exemplary embodiments described herein with reference to the following drawings.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION

The disclosure and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the disclosure in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Embodiments can be implemented in a computer communicatively coupled to a network (for example, the Internet), another computer, or in a standalone computer. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylist, etc.), or the like. In some embodiments, the computer has access to at least one database, which may local or accessed over the network.

ROM, RAM, and HD are computer memories for storing computer-executable instructions executable by the CPU or capable of being complied or interpreted to be executable by the CPU. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment, the computer-executable instructions may be lines of C++, Java, or any other programming or scripting code. Other software/hardware/network architectures may be used. For example, the functions of some embodiments may be implemented on one computer or shared among two or more computers. In one embodiment, the functions may be distributed in the network. Communications between computers implementing embodiments can be accomplished using any electronic, optical, ratio frequency signals, or other suitable methods and tools of communication in compliance with known network protocols.

Broadly speaking, embodiments of the linguistic similarity techniques described herein may be used for determination of similarity between any data construct, including term-to-term similarity and document-to-document similarity.

Further, the similarity determination(s) may be used in conjunction with a document retrieval system. For example, in a document retrieval system implementing term-to-term similarity, once terms are identified as being similar to one another, the terms may be used to retrieve documents that contain the term. Similarly, a document-to-document similarity search may result in returning to a user a predetermined number of similar documents.

Moving on, embodiments disclosed herein can comprise systems and methods for improved searching, indexing, and document retrieval. As noted above, however, the techniques described herein are not limited to such a system. Thus, the figures are exemplary only.

Figure 1:
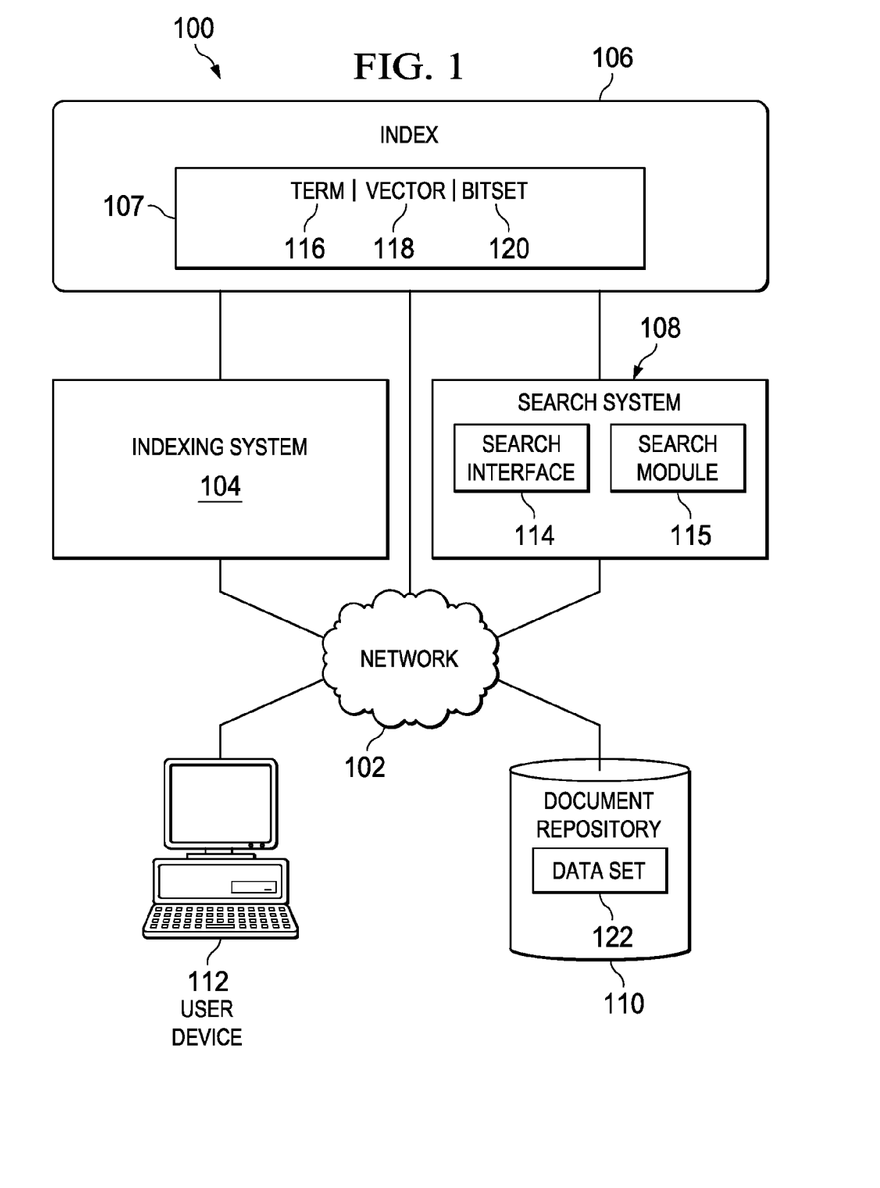
FIG. 1 is a diagram of an embodiment of a system for implementation of searches.

Turning now to the drawings and, with particular attention to FIG. 1, a diagram illustrating a search system that may be used in conjunction with a document retrieval system is shown and generally identified by the reference numeral 100. As illustrated, a data network 102 (e.g., a LAN, a WAN, the Internet, a wireless network or other network known in the art) communicatively couples an indexing system 104, an index store 106, a search system 108, a document repository 110, and one or more user devices 112.

The document repository 110 stores one or more data sets 122 of documents of interest. Documents may include any files containing text, and may be in any public or proprietary formats. Exemplary text formats include WORD, PDF, RTF, TXT, XML, HTML or other formats.

In some embodiments, the indexing system 104 indexes documents in the document repository 110 to create a search index 107 in the index store 106. In general, the indexing system 104 processes documents from the document repository 110, extracting terms from each document and adding them to the search index 107. The search index 107 comprises one or more lists of terms, each term associated with each of the documents in the data set 122 in which it appears. For example, the term may be associated with one or more document identifications or IDs. Other information may also be associated with the search index 107, such as where in each document the term appears and frequency of appearance, etc. Thus, in certain embodiments the search index 107 may comprise a list of terms. Each instance of the occurrence of a term in a document may be associated with the term in the search index 107. For example, an identifier of the document and the location of the occurrence in that document may be associated with the term for each instance of the occurrence of the term.

To generate the search index 107, the documents in a data set 122 are processed (e.g., by text extraction and a tokenizer or the like) to generate the terms of a document. Indexing system 104 receives these terms and determines if a term should be indexed. If indexing system 104 determines that the term should be indexed, the indexing system 104 checks to see if it that term is present in search index 107. If not, it is entered in the search index 107 and the associated information related to the occurrence of that term (such as document ID, placement within the document, etc.) in the document in which it appears is also entered.

The search index 107 may be arranged in any suitable manner, such as an ordered list or table. The search index 107 may be arranged, for example, in alphabetical order by terms or alphanumerically by document ID. Such an arrangement may aid or speed access or searching of index 107.

It is noted that, in some embodiments, a single search index may be provided as shown in the figures, and may be used to implement a standard as well as a similarity search. In other embodiments, the similarity searching techniques discussed herein may be provided in conjunction with a secondary index to generate additional results. That is, in some embodiments, a similarity search may be used to generate additional search terms from a secondary index generated according to techniques discussed herein to supplement a search performed on a primary index. Such a primary index may, for example, be an inverted index such as Lucene, or other index.

The search system 108 includes a search interface 114 for receiving queries from users at user devices 112 over the network 102, and a search module 115 implementing a search engine for executing searches of the documents 122 using search index 107. The user devices 112 may be implemented as any suitable devices for communicating over the network 102, such as personal, laptop, or tablet computers, cellular telephones, smartphones, and the like.

Thus, to perform a similarity search related to documents in data set 122, a user at user device 112 uses search interface 114 to input a query including one or more search terms which are received at the search system 108 via a search interface 114. The search module 115 receives the search terms and interacts with the search index 107 to find a set of documents responsive to the similarity search.

In accordance with embodiments, each term 116 in the search index 107 may be associated with a term vector 118 and a bitset signature 120. The term vectors 118 represent each term 116 and are used to define a similarity metric. Because there may be tens of thousands, or even more, term vectors, a comparison between all the term vectors of a data set can be relatively time-consuming. In particular, the time required makes it generally infeasible to scan all the different terms of the data set in the document repository 110 at query time. Consequently, a bitset signature 120 may be created from the term vectors. The bitset signature 120 may be significantly smaller than the corresponding term vector and approximately preserves a vector space similarity metric. That is, if term vectors are similar according to one or more methods of measuring similarity, then the corresponding bitset signatures 120 will likewise be similar.

These bitset signatures 120 can then be used to efficiently retrieve a subset of the terms of the data set 122, probably approximately related to the query term; this subset can then be scanned (that is, the similarity of the corresponding term vectors is determined) to retrieve the terms most similar to the input term. The query term and the retrieved terms can be used to search the data set(s) in the document repository 110.

Some implementations of system 100 employ a locality sensitive hashing (LSH) technique to create the bitset signatures from the term vectors. In particular, some implementations use a technique known as "simhash."

In general, LSH is a family of techniques using hash functions for mapping an input object v to a bitset index b such that if input objects v, u are similar (via some metric), their corresponding signatures $b^v$ and $b^u$ are also similar (via a possibly different, but usually related, metric). The hash functions in simhash, for example, map vectors v, u to bitset indices $b^v$, $b^u$ such that closeness (in Hamming distance) between the bitset indices approximates a cosine similarity between v and u.

Thus, to perform a search, a user may use user device 112 to input a query including a term to which is received at the search system 108 via a search interface 114. A search module 115 receives the term and interacts with the search index 107 to find a predetermined number of similar terms (e.g., the k-most similar terms) to the input term t, by:

(1) Retrieving the vector $v^t$ 118 and the corresponding bitset signature 120, $b^t$ (2) Retrieving the other bitset signatures b' 120 which are similar to $b^t$ according to a predetermined metric. In some embodiments, bitset signatures are retrieved that are less than a predetermined (Hamming) distance of d from $b^t$ (3) Selecting the term vectors v' 118 with these bitset signatures 120

(4) Selecting the k vectors 118 from this set which have the highest similarity to the term vector $v^t$ (5) Returning the terms 116 associated with these vectors (plus any other information, e.g., the similarity values)

The returned terms and the original search terms may then be used by the search engine to search the document repository. For example, the terms may be formed into one or more Boolean queries. The corresponding documents that include those terms may then be returned to the user 112 via the search interface 114. Alternatively, a list of the terms with links to corresponding documents might be presented to the user for display.

To implement simhash, then, during indexing, the simhash technique employs a plurality of random vectors called "hyperplanes" to define bitset signatures and determines closeness between bitset signatures using the Hamming distance, which approximates cosine similarity between the corresponding term vectors. According to this technique, a bitset signature for a vector is created as follows:

(1) A set of R random hyperplanes are created for the vector space, passing through the origin Each hyperplane partitions the space into a "positive" and "negative" regions (2) For each term vector, a bitset signature c is created of length R (3) The term vector is compared to each of the R hyperplanes: for the i hyperplane:

If the term vector is on the positive side of the hyperplane, set the bitset signature value $c_i$ to 1

Otherwise, leave the bitset signature value $c_i$ set to 0

(4) The distance between any two bitset signatures c and c' is the Hamming distance: the number of bits j such that $c_j \neq c'_j$ Several difficulties arise regarding the simhash technique. In general, the simhash technique requires costly generation and storage of many random hyperplanes in addition to the vectors corresponding to the actual terms. In order to add new terms, each term vector must be compared against the R hyperplanes to generate its bitset signature. As a consequence, incremental expansion (i.e., adding new documents to the data store 110) is relatively difficult.

What is desired then, are systems and methods which allow searches which reduce the storage requirements needed for, and processing time associated with, the implementation of such similarity searches using an index, and in particular that may reduce the time required when processing and returning results to a query. To that end, attention is now directed to the embodiments of systems and methods for searches for indexing and searching presented herein.

As will be explained in greater detail below, a searching technique according to embodiments offers both storage and performance advantages over prior techniques. More particularly, a similarity hashing technique according to some embodiments employs random indexing (RI) to create fixed dimensionality RI index vectors representing terms, then converts the RI index vectors to bitset signatures. In addition, a method according to some embodiments may create additional higher dimensionality RI content vectors for more accurate similarity calculation. Such techniques require substantially less storage and allows for relatively faster searches than using simhash.

In some embodiments, RI index vectors are converted to bitset signatures by generating bitset signatures having a length twice that of the RI index vectors. The bitset signature corresponding to an RI index vector may then be populated by values assigned (according to predetermined criteria) to lower and upper halves of the bitset signature. In particular, in some embodiments, in the lower half of the bitset signature, dimensions corresponding to dimensions of the RI index vectors having relatively high magnitude positive values are assigned a value of 1. In the upper half, dimensions corresponding to dimensions of the RI index vectors having relatively high magnitude negative values are likewise assigned a value of 1.

Figure 2:
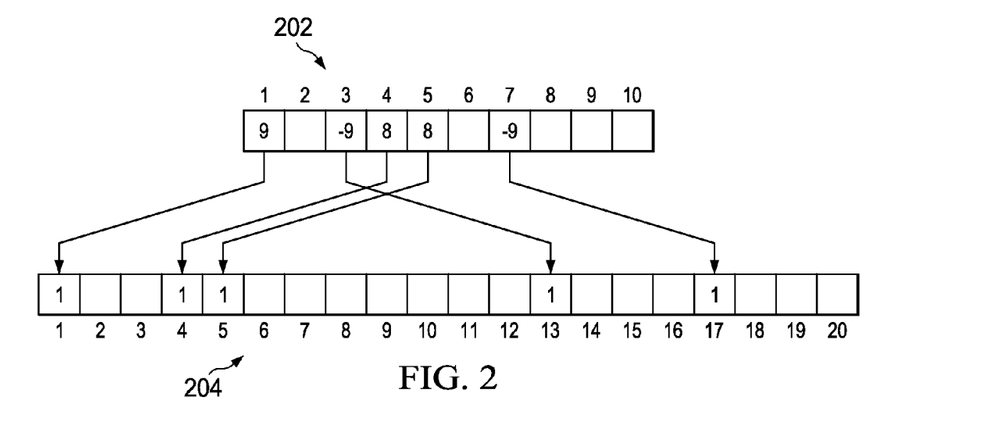
FIG. 2 is a diagram illustrating a technique according to embodiments.

For example, as shown in FIG. 2, from an RI index vector 202 of dimensionality (length) d, create a bitset signature 204 of length 2d. In the example illustrated, d=10 and therefore the dimension of the bitset signature 204 is 2d=20. Each of the dimensions i (1=1-10) of the RI index vector 202 will have a value in a certain range (defined by the method of generating the vector). For each of k highest magnitude positive dimensions i of the RI index vector, set dimension i of the bitset to 1. This will populate the lower half of the bitset signature. For example, as shown, the RI index vector 202 has for dimensions i=1, 4, and 5, values 9, 8, and 8, respectively. Thus, the bitset signature 204 has its dimensions 1, 4, and 5 set to 1.

Similarly, for each of the k highest magnitude negative dimensions of the vector, set dimension i+d to 1. This will populate the upper half of the bitset signature. For example, as shown, the RI index vector 202 has values −9 and −9 at dimensions i=3 and 7, respectively. Consequently, the bitset signature 204 is assigned the value of 1 at dimensions 13 and 17.

Bitset signatures may be compared by how many dimensions having a value of 1 they have in common. In practice, this metric for similarity of bitset signatures approximates the similarity of the RI index vectors with respect to cosine similarity. In implementations in which RI index vectors are relatively small, and additional full-sized RI content vectors are used, this in turn approximates the similarity of the terms using full-size vector cosine similarity.

Figure 3:
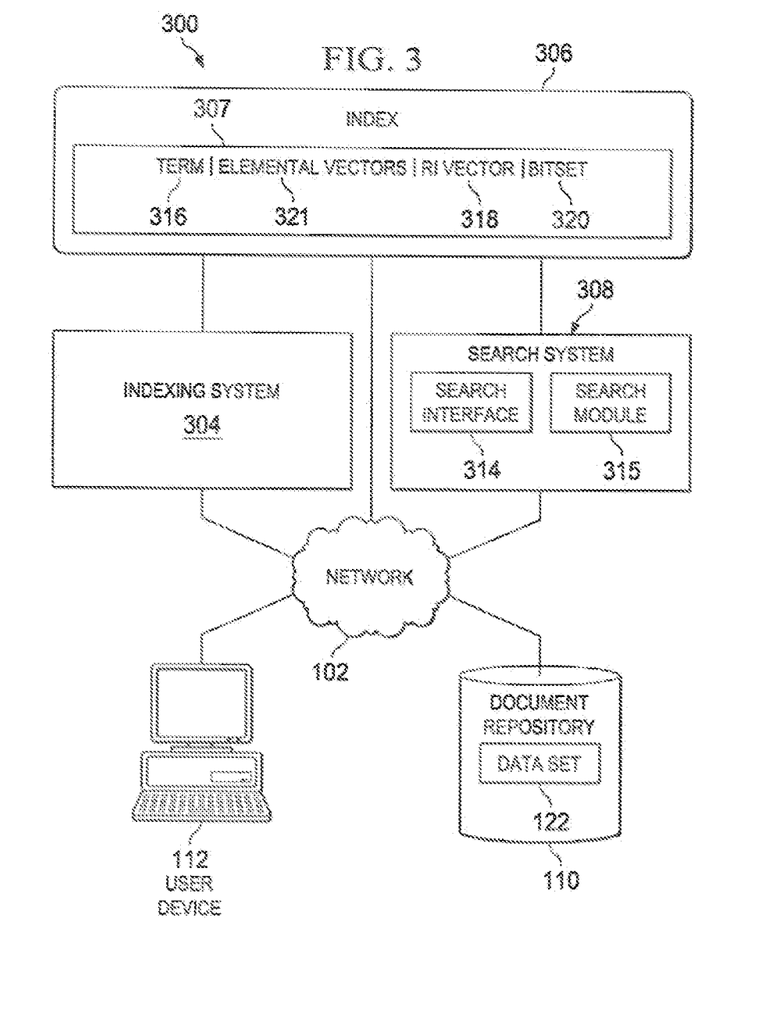
FIG. 3 is a diagram of an embodiment of a system for implementation of searches.

An exemplary search system employing RI index vectors is shown in FIG. 3 and generally identified by the reference numeral 300. In the implementation illustrated, a data network 102 (e.g., a LAN, a WAN, the Internet, a wireless network or other network known in the art) communicatively couples an indexing system 304, an index store 306, a search system 308, a document repository 110, and one or more user devices 112.

The indexing system 304 indexes documents in the document repository 110 to create a search index 307 in the index store 306. In general, the indexing system 304 processes documents from the document repository 110, extracting terms 316 from each document and adding them to the search index 307. The search index 307 comprises one or more lists of terms, each term associated with the document in which it appears. Other information may also be associated with the search index 307, such as where in each document the term appears and frequency of appearance, etc.

In addition, each term 316 in the search index 307 is associated with RI index vector 318, and a bitset signature 320. The RI index vectors 318 represent each term and are used to define a similarity metric and are used to generate the bitset signatures 320. The elemental vectors 321 may be used to generate the RI index vectors, as will be explained in greater detail below.

Figure 4:
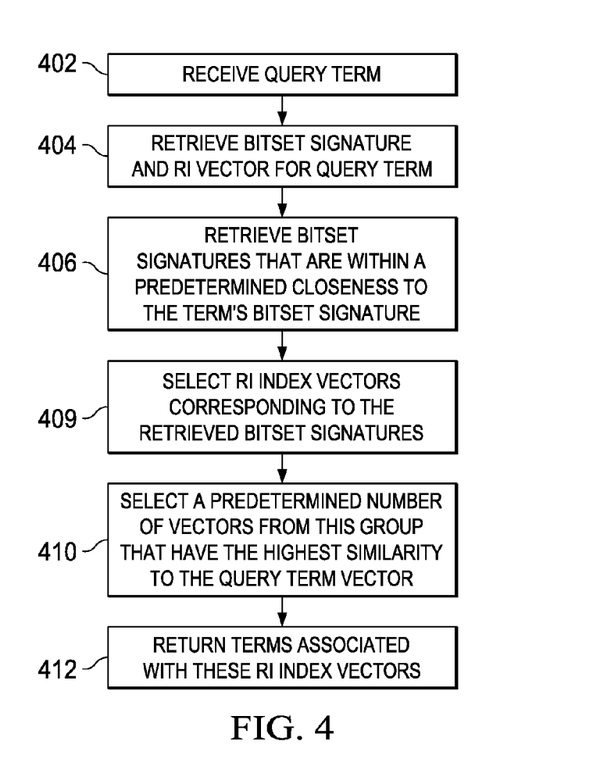
FIG. 4 is a flowchart illustrating operation of embodiments.

A search according to embodiments is shown in FIG. 4. A user at a user device 112 (FIG. 3) may input a query term that is received at the search interface 314 of the search system 308 (step 402). The search module 315 may retrieve the term's bitset signature 320 and RI index vector 318 from the index 306 (step 404). The search module 315 then may retrieve other bitset signatures from the index 306 that are within a predetermined closeness or similarity to the query term's bitset signature (step 406). For example, bitsets a and b may be compared by a variation of Hamming distance: the similarity between bitset signatures is the number of dimensions i for which $a_i=b_i=1$.

The search module 315 may then select those RI index vectors corresponding to the retrieved bitset signatures (step 409). The RI index vectors may then be compared and a predetermined number of them, corresponding to those having a highest similarity to the query term RI index vector, may be selected (step 410), The search module 315 then may return the terms associated with these RI index vectors to the search interface 314 for display to the user device 112 (step 412), The terms may then be used to search the dataset, for example, by using the returned terms in one or more Boolean queries. The results may include links or identifications of where documents that include those terms are stored in the data repository 11.

As noted above, according to some embodiments, a technique known as "random indexing" is used to generate RI index vectors.

Random indexing (RI) is a method for dimensionality reduction, specifically for the construction of vectors representing terms (or documents) in a large data-set with a fixed-dimensionality vector space representation; the parameter D indicates the desired dimensionality. (In some embodiments, D=500, although D may vary.) This can then be used to calculate the semantic similarity of the terms themselves, via cosine similarity between the vectors.

A central idea of RI is that a given content—for example, a content is a document—has associated with it an "elemental" vector, a vector of the same dimensionality D as the term vector space being generated. An elemental vector has a small number of non-zero elements, specified using the parameter 2d. (In some embodiments, d=5, so 2d=10. It is noted that other values may be used for these parameters.) A term vector v will have dimensionality D and be initialized to all zeros; then, each term vector is updated by adding to it the elemental vector for each document in which it occurs.

To illustrate, assume the parameters are as follows:
D=10
d=5
Assume term t occurs in documents doc1, doc2, doc3 only. Assume moreover that these documents have the following elemental vectors:
doc1=[−1, 0, 0, 1, 0, 1, 0, 0, −1, 0]
doc2=[0, 0, −1, −1, 0, 1, 0, 0, 1, 0]
doc3=[0, 0, −1, 0, 1, 1, 0, 0, −1, 0]
Then the final term vector for t would be:
$v_t$=[−1, 0, −2, 0, 1, 3, 0, 0, −1, 0]

It is noted that in some embodiments, the vector space is generated from an inverted index (a search index) of the data set 122. In some embodiments, the inverted index is generated using Apache Lucene, an open source information retrieval library. Inverted indexes generated by Lucene are structured so that the set of distinct terms can be streamed very efficiently; moreover the document IDs for the documents a given term occurs are stored with the term in the inverted index, and can thus be retrieved very quickly.

However, this means that a given document ID will be encountered at different times over the duration of the term vector creation process. As such, in some embodiments, rather than maintaining elemental vectors in memory, universal hashing may be used to map document IDs to elemental vectors.

Figure 5:
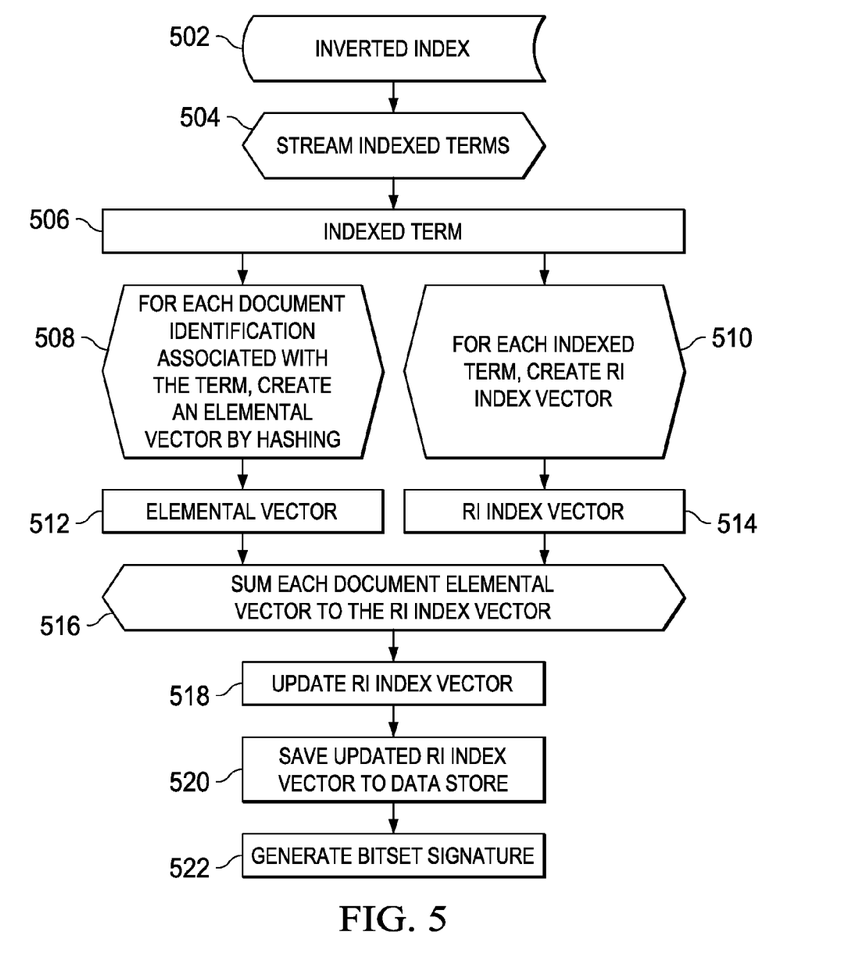
FIG. 5 is a flowchart illustrating operation of embodiments.

Turning now to FIG. 5, a diagram schematically illustrating the use of random indexing to create RI index vectors from an inverted index is shown. According to some embodiments, input parameters are D=the desired dimensionality of the RI index vector space, and d=the parameter for elemental vectors.

A document elemental vector may have d dimensions=1 and d dimensions=−1. Terms (e.g., from an index) are streamed (504), for example, from the inverted index (502) (The order does not matter. Terms can be efficiently streamed in the order in which they are stored on disk). For each indexed term (506), a zero-valued RI vector (514) of dimensionality D is created (510). In addition, for each document II) associated with the term in the inverted index (502), an elemental vector (512) is created (508). The elemental vector has d dimensions=1 and d dimensions=−1, where these dimensions are selected using universal hashing. Each document elemental vector (512) is summed (516) to the RI vector (514), updating the RI vector data structure. When this has been done for all of the document IDs associated with the term, the RI vector is complete (518), The RI vector may be stored to a database (520) indexed by the terms. The bitset signature may be generated from the RI index vector (522), as discussed above with reference to FIG. 2.

The method discussed above creates bitset signatures 320 (FIG. 3) from RI index vectors 318 for fast look-up for similarity calculation. Broadly speaking, embodiments use random indexing to build fixed (and typically small, though any size may be used) dimensional index vectors 318 to represent the terms, then convert these small index vectors 318 to bitset signatures 320 to use at query-time.

However, using small vectors for semantic similarity computation may be less accurate than using larger dimensional vectors. So, some embodiments use random indexing to create two or more vectors for each term: a large content vector for (more) accurate similarity computation, and a small index vector for indexing and faster lookup.

Figure 6:
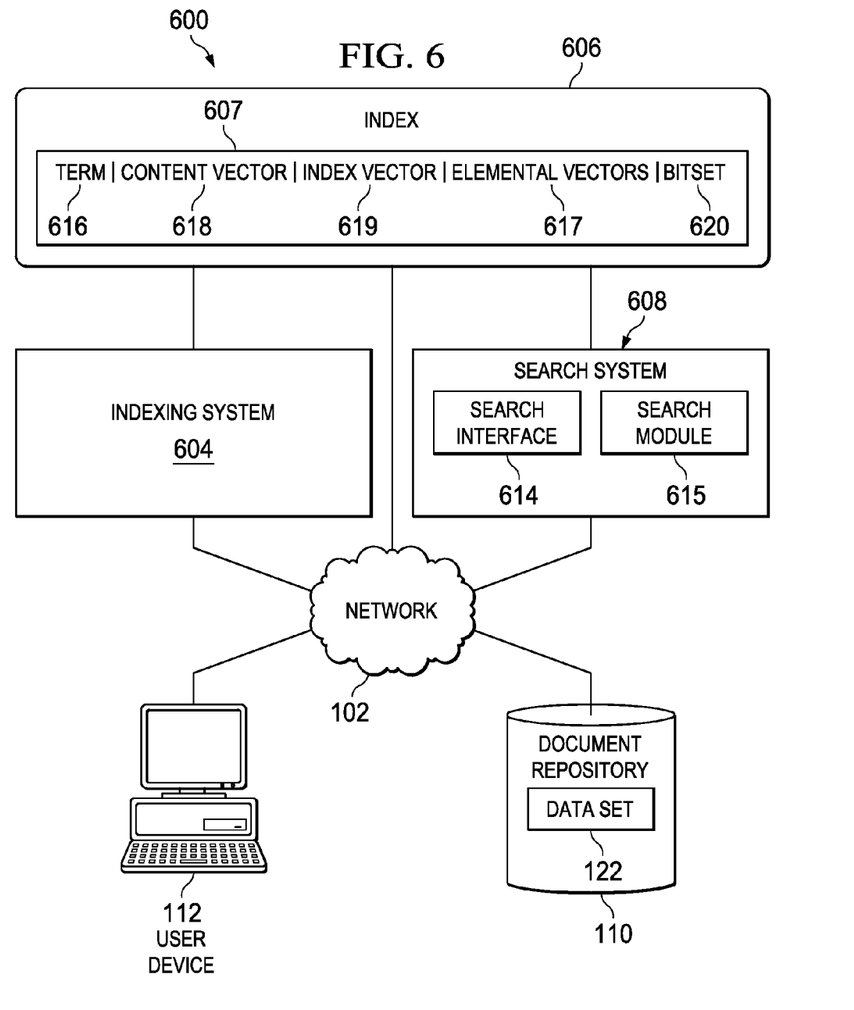
FIG. 6 is a diagram of an embodiment of a system for implementation of searches.

An embodiment of such a system is shown with reference to FIG. 6. In system 600, a data network 102 (e.g., a LAN, a WAN, the Internet, a wireless network or other network known in the art) communicatively couples an indexing system 604, an index store 606, a search system 608, a document repository 110, and one or more user devices 112.

The indexing system 604 indexes documents in the document repository 110 to create a search index 607 in the index store 606, In general, the indexing system 604 processes documents from the document repository 110, extracting terms 616 from each document and adding them to the search index 607. The search index 607 comprises one or more lists of terms, each term associated with the document in which it appears. Other information may also be associated with the search index 607, such as where in each document the term appears and frequency of appearance, etc.

In addition, each term 616 in the search index 607 is associated with an RI content vector 618, an RI index vector 619, and a bitset index or signature 620. The RI content vectors 618 represent each term and are used to define a similarity metric. The RI index vectors 619 are smaller vectors that approximate the similarity metric of the content vectors 618 and are used to generate the bitset signatures 620. The elemental vectors 617 may be implemented as content elemental vectors and index elemental vectors and may be used to generate the RI content vectors 618 and RI index vectors 619. As will be explained in greater detail below, they may thus be of dimensions corresponding to those of the RI content vectors 618 and RI index vectors 619, respectively.

Figure 7:
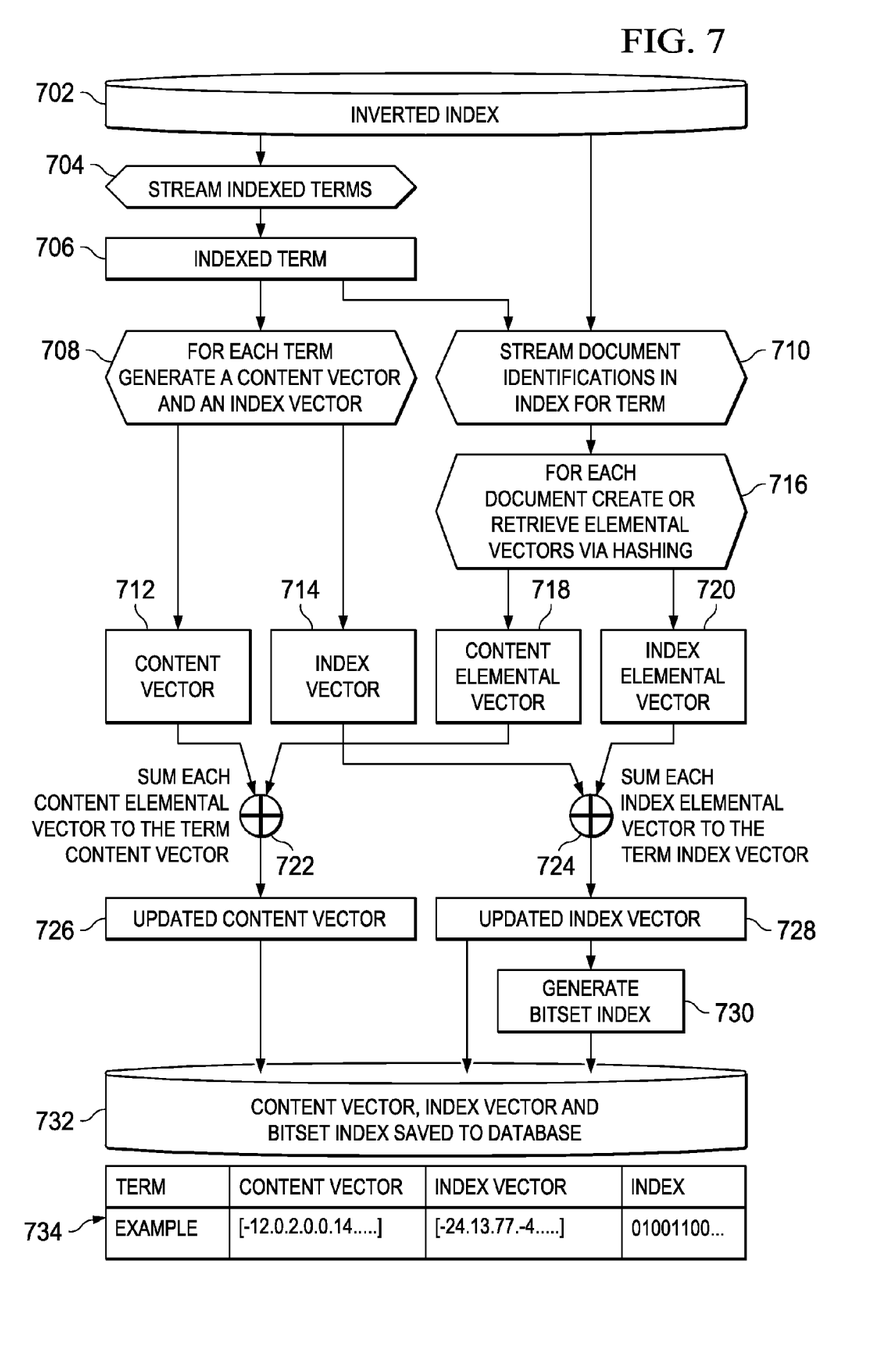
FIG. 7 is a flowchart illustrating operation of embodiments.

Turning now to FIG. 7, a diagram schematically illustrating creating bitset signatures is shown. More particularly, the diagram illustrates the creation of RI content vectors, RI index vectors, and bitset signatures by streaming terms and the documents they occur in from an inverted index. It is noted that the RI content vectors and the RI index vectors are "term vectors" of differing dimension.

Parameters include random indexing parameters D, d as above, for the RI content vectors (sample values: D=500, d=10), as well as corresponding random indexing parameters D, d' for the RI index vectors (sample values: D'=32, d'=2). Finally, the bitset creation parameter is k (sample value: 4). It is noted that, in other embodiments, different values for each of these parameters may be used.

From the inverted index (702), individual terms (706) may be streamed or otherwise obtained (704). For each term (706), two empty vectors may be created (708): a content vector (712) of dimensionality D and an index vector (714) of dimensionality D'.

For the current term, each of the document IDs for the documents in which it appears may be streamed from the inverted index (710) or otherwise obtained. For each document ID, two elemental vectors may be created (716): a content elemental vector (718), of length D, with 2d non-zero dimensions: d dimensions valued 1 and d dimensions value −1, chosen randomly (as before, a hashing technique may be used to create this elemental vector); and an index elemental vector (720), of length D', with 2d' non-zero dimensions: d' dimensions valued 1 and d' dimensions valued −1, chosen randomly.

The term content vector (712) may be updated by adding to it the content elemental vector for each document ID associated with the term, in (722). When this process is complete for all document IDs associated with the term, the content vector has been completed (726).

Likewise, the term index vector (714) may be updated with the index elemental vector (720) for each of the document IDs associated with the term, in (724). When this process is complete for all document IDs associated with the term, the index vector has been completed (728).

A bitset signature may then be generated from the index vector (730), using the technique of FIG. 2, and as will be described in greater detail below. Finally, the term, the content vector, the index vector, and the bitset signature (734) may be saved to a data store for future retrieval (732).

In some embodiments, the index vector may not be accessed during term lookup or similarity calculation. However it may be retained so this data may be updated with new document IDs associated with the term, in the future.

Figure 8:
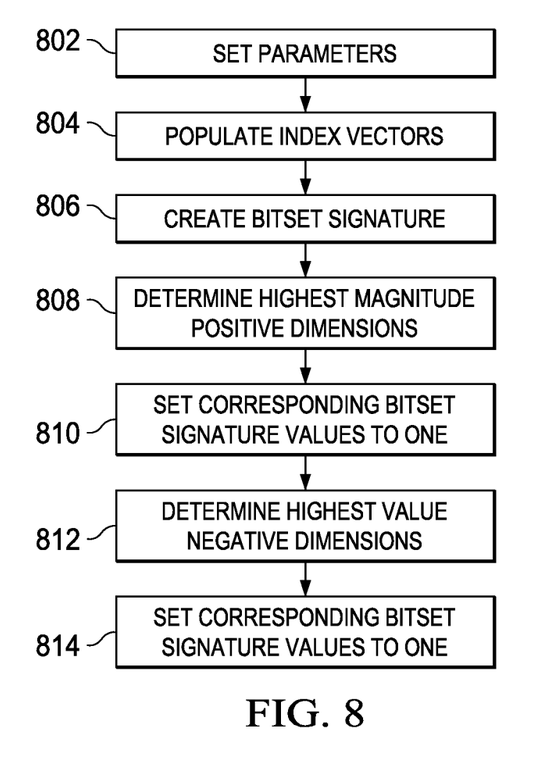
FIG. 8 is a flowchart illustrating operation of embodiments.

A flowchart illustrating creation of bitset signatures from index vectors is shown in FIG. 8.

Initially, input parameters are set (step 802). In some embodiments, input parameters include B—the length of the small vectors, so the length of the bitset signatures will be 2B (concretely: 32 or 64 are good values for this, although other values may be used); the random indexing parameter for the elemental vectors; and the bitset dimensional factor k—the number of positive and negative dimensions of the small vectors to flag in the bitset.

An index vector v is created for each term, of length B, and is populated using the random indexing method described above (step 804).

The index vector is converted to a bitset signature as follows: create the new bitset b (all 0s)(step 806). Determine the k highest magnitude positive dimensions i in the index vector—i.e., the dimensions i such that $v_i>0$ and $|v_i|$ are the k largest values (step 808) and set these $b_i$ to 1 (step 810). Similarly, determine each of the k highest magnitude negative dimensions j in the index vector, (step 812), and set $b_{j+B}$ to 1 (step 814).

Figure 9:
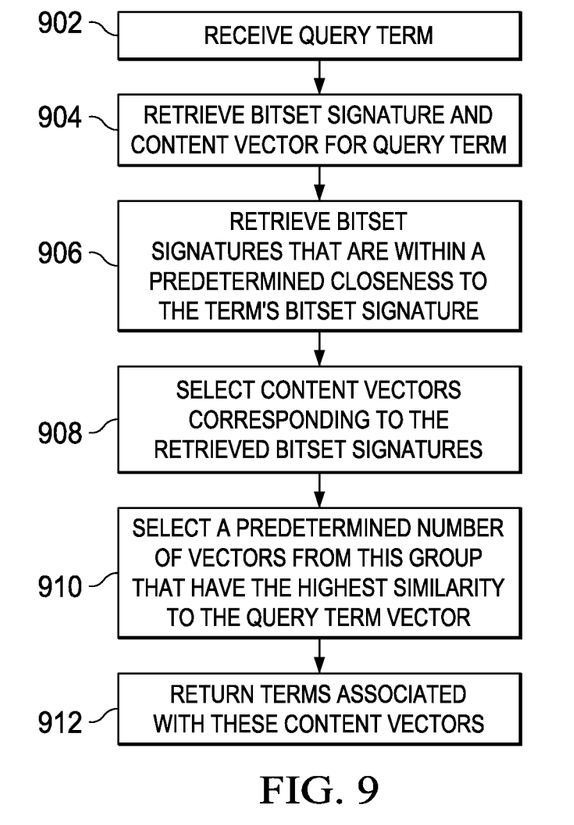
FIG. 9 is a flowchart illustrating operation of embodiments.

Turning now to FIG. 9, a diagram illustrating a search according to embodiments is shown. A user at a user device 112 (FIG. 6) may input a query including at least one term that is received at the search interface 614 of the search system 608 (step 902). The search module 615 may retrieve the term's bitset signature 620 and content vector 618 from the index 606 (step 904). The search module 615 then may retrieve other bitset signatures from the index 606 that are within a predetermined closeness or similarity to the query term's bitset signature (step 906). For example, bitsets a and b may be compared by a variation of Hamming distance: the similarity between bitset signatures is the number of dimensions i for which $a_i=b_i=1$.

The search module 615 then may select those content vectors corresponding to the retrieved bitset signatures (step 908). The content vectors may then be compared and a predetermined number of them, corresponding to those having a highest similarity to the query term vector, may be selected (step 910). The search module 615 then may return the terms associated with these content vectors to the search interface 614 for display to the user device 112 (step 912). One or more of the returned terms may be used to search the data set, for example, by using the returned terms in one or more Boolean queries. The results may include links or identifications of where documents that include those terms are stored in the data repository 110.

Figure 10:
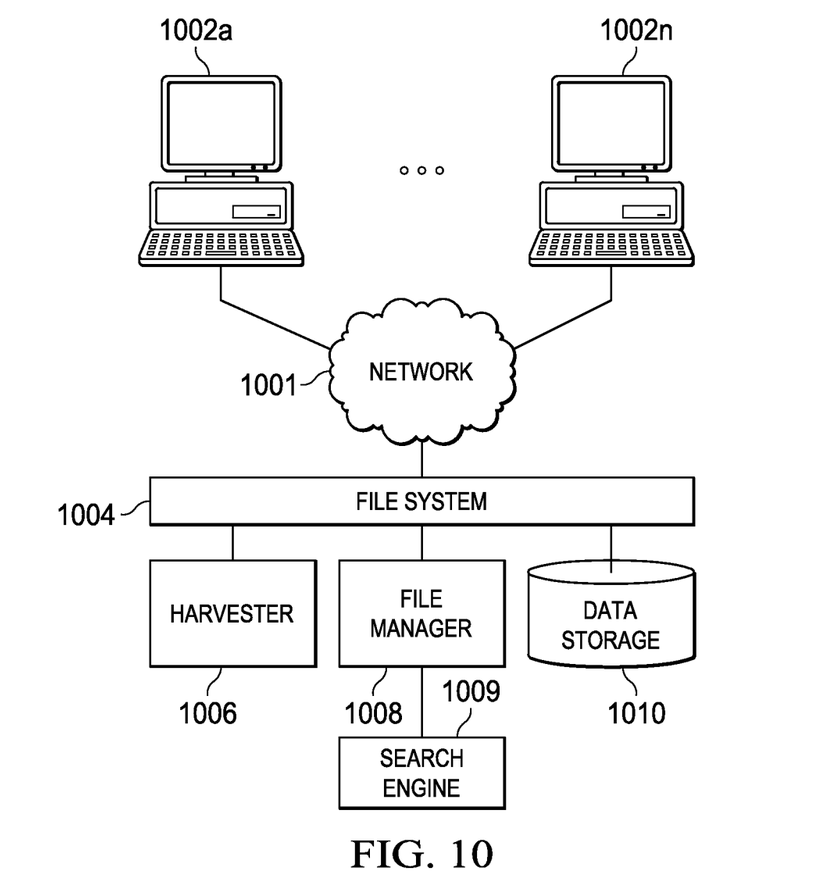
FIG. 10 illustrates an embodiment of a file management system.

FIG. 10 is a diagrammatic representation of a network system in which file system management and index searching can be implemented according to embodiments disclosed herein. A data network 1001 (e.g., a LAN, a WAN, the Internet, a wireless network or other network known in the art) connects a number of computers 1002a-1002n and a file system 1004. One or more of the computers 1002a-1002n may be, for example, personal computers, tablet computers, laptop computer, workstations or other devices capable of communicating over or sharing data via the network 1001. In addition, or alternatively, one or more of the computers 1002a-1002n may be servers connected to one or more storage devices (e.g., hard drives, tape drives, disk drives or other storage media device known in the art) whose content may be shared out over network 1001 according to a network file system protocol.

The file system 1004 may be implemented as a server and may include or be coupled with a harvester 1006, a search engine 1009, a file system manager 1008, and data storage 1010. The harvester 1006 may be configured to "harvest" file data or metadata from computers and/or servers of interest on network 1001 and store them in data storage 1010 (e.g. as a data set of documents). Harvested file data or metadata may be used to build one or more indices suitable for use in a stem searching system according to embodiments. Metadata may comprise, for example, a file name, some explicit/static information such as its owner, size, and so on, its contents or data, and an arbitrary and open set of implicit or "dynamic" metadata such as the file's content type, checksum, and so on. Data storage 1010 may further store semantic search indices, as described above. Accordingly, the file data or metadata harvested from one or more file systems 1004 by harvester 1006 and stored in data storage 1010 may be efficiently searched using semantic searches using embodiments of the systems and methods presented herein.

Further details of an exemplary harvesting and file management system may be found in commonly-assigned, co-pending U.S. patent application Ser. No. 12/572,116, filed Oct. 1, 2009, entitled "Method and Apparatus for Harvesting File System Metadata," which is hereby incorporated by reference in its entirety as if fully set forth herein. Exemplary systems and methods for managing file systems may be found in commonly-assigned U.S. Pat. No. 7,610,329, U.S. Pat. No. 8,032,501, U.S. Pat. No. 8,086,553, and commonly-assigned and co-pending U.S. patent application Ser. No. 13/301,503, all titled "Method and Apparatus for Managing File Systems and File-Based Data," and all of which are hereby incorporated by reference in their entireties as if fully set forth herein.

Although embodiments have been described and illustrated in detail, it should be understood that the embodiments and drawings are not meant to be limiting. Various alterations and modifications are possible without departing from the spirit and scope of the disclosure. Accordingly, the scope of the disclosure should be determined by the following claims and their legal equivalents.

What is claimed is:

1. A computer-implemented system for searching, comprising:
a data store accessible via a network for storing a data set;
an indexing system coupled to the network and indexing the data set, the indexing system including a processor configured to:
generate content vectors for terms in the data set, wherein the content vectors define a similarity metric;
generate index vectors for the terms in the data set from the content vectors to access the terms in the data set; and
generate bitset signatures from the index vectors to determine similarity with the terms in the data set, wherein the bitset signatures include a first section for positive magnitude values and a second section for negative magnitude values, and generating the bitset signatures from the index vectors comprises:
for each of a predetermined number of highest magnitude positive values in the corresponding index vector, setting a corresponding bitset signature value at a corresponding dimension in the first section to a predetermined value; and
for each of a predetermined number of highest magnitude negative values in the corresponding index vector, setting a corresponding bitset signature value at a corresponding dimension in the second section to the predetermined value; and
a search module coupled to the network and including a processor configured to receive a search query and perform a search on each of one or more terms in the search query by:
accessing a bitset signature and content vector corresponding to a term in the search query;
retrieving bitset signatures that are within a predetermined closeness to the accessed bitset signature;
selecting content vectors corresponding to the retrieved bitset signatures;
identifying the selected content vectors that are within a predetermined similarity to the accessed content vector corresponding to the term in the search query; and
returning the terms of the data set corresponding to the identified content vectors.

2. A system according to claim 1, wherein the index vectors and the content vectors for the terms in the data set are generated using random indexing.

3. A system according to claim 1, wherein the index vectors and the content vectors for the term s in the data set are generated using hashing.

4. A system according to claim 1, wherein the generated index vectors are smaller in dimension than the generated content vectors.

5. A system according to claim 1, wherein the bitset signatures are twice a length of the generated index vectors.

6. A system according to claim 1, wherein the one or more terms in the search query and the terms corresponding to the identified content vectors are used to search the data set.

7. A computer program product comprising one or more non-transitory computer readable storage media storing instructions translatable by one or more processors to perform:
generating content vectors for terms in a data set, wherein the content vectors define a similarity metric;
generating index vectors for the terms in the data set from the content vectors to access the terms in the data set; and
generating bitset signatures from the index vectors to determine similarity with the terms in the data set, wherein the bitset signatures include a first section for positive magnitude values and a second section for negative magnitude values, and generating the bitset signatures from the index vectors comprises:
for each of a predetermined number of highest magnitude positive values in the corresponding index vector, setting a corresponding bitset signature value at a corresponding dimension in the first section to a predetermined value; and
for each of a predetermined number of highest magnitude negative values in the corresponding index vector, setting a corresponding bitset signature value at a corresponding dimension in the second section to the predetermined value;
storing the bitset signatures and content vectors in an index; and
performing a search on each of one or more terms in a search query by:
accessing a bitset signature and content vector from the index corresponding to a term in the search query;
retrieving bitset signatures from the index that are within a predetermined closeness to the accessed bitset signature;
selecting content vectors from the index corresponding to the retrieved bitset signatures;
identifying the selected content vectors that are within a predetermined similarity to the accessed content vector corresponding to the term in the search query; and
returning the terms of the data set corresponding to the identified content vectors.

8. A computer program product according to claim 7, wherein the index vectors and the content vectors for the terms in the data set are generated using random indexing.

9. A computer program product according to claim 7, wherein the index vectors and the content vectors for the terms in the data set are generated using hashing.

10. A computer program product according to claim 7, wherein the generated index vectors are smaller in dimension than the generated content vectors.

11. A computer program product according to claim 7, wherein the bitset signatures are twice a length of the generated index vectors.

12. A computer program product according to claim 7, wherein the one or more terms in the search query and the terms corresponding to the identified content vectors are used to search the data set.

13. A computer-implemented method, comprising:
generating content vectors for terms in a data set stored in a data store, wherein the content vectors define a similarity metric;
generating index vectors for the terms in the data set from the content vectors to access the terms in the data set;
generating bitset signatures from the index vectors to determine similarity with the terms in the data set, wherein the bitset signatures include a first section for positive magnitude values and a second section for negative magnitude values, and generating the bitset signatures from the index vectors comprises:
for each of a predetermined number of highest magnitude positive values in the corresponding index vector, setting a corresponding bitset signature value at a corresponding dimension in the first section to a predetermined value; and
for each of a predetermined number of highest magnitude negative values in the corresponding index vector, setting a corresponding bitset signature value at a corresponding dimension in the second section to the predetermined value;
storing the bitset signatures and content vectors in an index; and
performing a search on each of one or more terms in a search query received via a computer by:
accessing a bitset signature and content vector from the index corresponding to a term in the search query;
retrieving bitset signatures from the index that are within a predetermined closeness to the accessed bitset signature;
selecting content vectors from the index corresponding to the retrieved bitset signatures;
identifying the selected content vectors that are within a predetermined similarity to the accessed content vector corresponding to the term in the search query; and
returning the terms of the data set corresponding to the identified content vectors from the data store.

14. A method according to claim 13, wherein the index vectors and the content vectors for the terms in the data set are generated using random indexing.

15. A method according to claim 13, wherein the index vectors and the content vectors for the terms in the data set are generated using hashing.

16. A method according to claim 13, wherein the generated index vectors are smaller in dimension than the generated content vectors.

17. A method according to claim 13, wherein the bitset signatures are twice a length of the generated index vectors.

18. A method according to claim 13, wherein the one or more terms in the search query and the terms corresponding to the identified content vectors are used to search the data set.

* * * * *